United States Patent
Sekiguchi et al.

(10) Patent No.: US 6,665,345 B1
(45) Date of Patent: Dec. 16, 2003

(54) MOVING PICTURE DECODING DEVICE AND MOVING PICTURE DECODING METHOD

(75) Inventors: Shunichi Sekiguchi, Tokyo (JP); Yoshimi Isu, Tokyo (JP); Kohtaro Asai, Tokyo (JP); Fuminobu Ogawa, Tokyo (JP); Yuri Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/530,996

(22) PCT Filed: Feb. 15, 2000

(86) PCT No.: PCT/JP00/00839

§ 371 (c)(1),
(2), (4) Date: May 9, 2001

(87) PCT Pub. No.: WO00/49811

PCT Pub. Date: Aug. 24, 2000

(30) Foreign Application Priority Data

Feb. 16, 1999 (JP) .............................. 11-37621

(51) Int. Cl.[7] .............................. H04N 7/64; H04N 7/66
(52) U.S. Cl. .............................. 375/240.25; 375/240.27
(58) Field of Search ........................ 375/240.25, 240.27; H04N 7/64, 7/66

(56) References Cited

U.S. PATENT DOCUMENTS 5,838,873 A * 11/1998 Blatter et al. .......... 375/240.25

FOREIGN PATENT DOCUMENTS

| JP | 6311052 | 11/1994 |
| JP | 8274785 | 10/1996 |
| JP | 8331559 | 12/1996 |
| JP | 9121347 | 5/1997 |

OTHER PUBLICATIONS

S. Aign, "Error Concealment, Early Re–Synchronization, and Iterative Decoding for MPEG–2", IEEE Int. Conf. Commun. vol. 1997, No. vol. 3, pp. 1654–1658, 1997.
W. Keck, "A Method for Robust Decoding of Erroneous MPEG–2 Video Bitstreams," Dig. Tech. Pap. IEEE Int. Conf. Consum. Electron vol. 1996, pp. 102–103, 1996.

* cited by examiner

Primary Examiner—Howard Britton
(74) Attorney, Agent, or Firm—Birch, Stewart, Kolasch & Birch, LLP

(57) ABSTRACT

A moving image decoding apparatus sets, if it completes decoding current coded data without detecting an error and if an occurrence of a discontinuity is detected between the current coded data and the next coded data, a resynchronization point at an initial position of subsequent coded data following the next coded data.

20 Claims, 7 Drawing Sheets

ON BIT STREAM

ON IMAGE SPACE

ON BIT STREAM

ON IMAGE SPACE $$P(1, n) > P(1, n-1) + K_{n-1}$$

MOVING PICTURE DECODING DEVICE AND MOVING PICTURE DECODING METHOD

This application is the national phase under 35 U.S.C. §371 of PCT International Application No. PCT/JP00/00839 which has an International filing date of Feb. 15, 2000, which designated the United States of America.

BACKGROUND OF THE INVENTION

1. Field of the Invention

The present invention relates to a video decoder implementation technique based on moving image compression and decompression schemes of various international standards, and particularly to a moving image decoding apparatus and a moving image decoding method with a function to improve robustness against bit errors occurring in a bit stream.

2. Description of Related Art

Conventional moving image coding schemes such as MPEG-2 Video (ISO/IEC 13818-2) are designed such that when they detect an error while decoding coded data, they can return (resynchronize) to normal decoding on a slice by slice basis, each slice consisting of a plurality of macroblocks (each macroblock including a luminance signal consisting of 16×16 pixels and chrominance signal consisting of 8×8 pixels)

The initial macroblock of each slice can identify its absolute position in a picture by itself. Thus, detecting a start code (slice start code) indicating the initial position of the slice in a bit stream (coded data) enables decoding to be restarted from the right position in the picture.

To determine the position in the picture, information is needed that represents the position of the slice in the picture (lower eight bits of the slice start code). If any bit error takes place in the bit field, the slice cannot be displayed in a right place. This can be decided by detecting discontinuity from the previous slice.

However, since the position of the slice in the picture is represented by the eight bits of a fixed length, it is very difficult to recognize any bit error as an error. In addition, because the number of macroblocks per slice can be identified for the first time by learning the position of the initial macroblock in a new slice detected, it is not easy when a discontinuity is detected to uniquely decide as to whether the discontinuity arises from continuing decoding based on erroneous synchronization in the previous slice, or from erroneously identifying the position of the initial macroblock in the slice in the picture.

Accordingly, it is unavoidable to continue the decoding on the assumption that the position of the initial macroblock in the newly detected slice is correct. This can result in sharp degradation in the picture because of the misidentification of the position of the initial macroblock in the slice.

With the foregoing structure, the conventional moving image decoding method has a problem of discarding unimpaired macroblocks because when the discontinuity of the coded data is detected, it is unavoidable to set a resynchronization point at the position of the initial macroblock in the newly detected slice regardless of the cause of the discontinuity.

The present invention is implemented to solve the foregoing problem. It is therefore an object of the present invention to provide a moving image decoding apparatus and a moving image decoding method capable of minimizing image degradation due to errors by properly setting the resynchronization point in accordance with the cause of the discontinuity.

Another object of the present invention is to provide a moving image decoding apparatus and a moving image decoding method capable of properly concealing the data of lost macroblocks because of errors.

SUMMARY OF THE INVENTION

A moving image decoding apparatus according to the present invention comprises: resynchronization means for setting, if decoding means completes decoding of coded data without detecting any error in the coded data and if reviewing means detects an occurrence of a discontinuity, a resynchronization point at an initial position of coded data subsequent to the next coded data.

This makes it possible to set a suitable resynchronization point in response to the cause of the occurrence of the discontinuity, and hence offers an advantage of being able to minimize the image degradation due to errors.

A moving image decoding apparatus according to the present invention comprises: resynchronization means for setting, if decoding means completes decoding of coded data without detecting any error in the coded data and if reviewing means detects an occurrence of a discontinuity, a resynchronization point at an initial position of the next coded data estimated by the reviewing means.

This makes it possible to set a suitable resynchronization point in response to the cause of the occurrence of the discontinuity, and hence offers an advantage of being able to minimize the image degradation due to errors.

A moving image decoding apparatus according to the present invention comprises: concealment means for performing, if decoding means detects an error in data multiplexed after a unique word and if reviewing means detects an occurrence of a discontinuity, a concealment processing of the data without using motion vectors obtained from the coded data, and for performing, if the decoding means detects an error in the data multiplexed after the unique word and if the reviewing means does not detect any occurrence of a discontinuity, a concealment processing of the data using the motion vectors obtained from the coded data.

This offers an advantage of being able to carry out suitable concealment of the macroblock data lost by errors.

The reviewing means of the moving image decoding apparatus according to the present invention can identify the occurrence of the discontinuity when a gap is present between the two adjacent coded data.

This offers an advantage of being able to detect the occurrence of the discontinuity easily.

The reviewing means of the moving image decoding apparatus according to the present invention can identify the occurrence of the discontinuity when an overlap is present between the two adjacent coded data.

This offers an advantage of being able to detect the occurrence of the discontinuity easily.

The moving image decoding apparatus according to the present invention can contain motion vectors in the data multiplexed before the unique word.

This offers an advantage of being able to perform concealment processing using the motion vectors even if an error takes place in the data after the unique word.

A moving image decoding method according to the present invention sets, if decoding of coded data is completed without detecting any error in the coded data and if an occurrence of a discontinuity is detected between the coded data and the next coded data, a resynchronization point at an initial position of coded data subsequent to the next coded data.

This makes it possible to set a suitable resynchronization point in response to the cause of the occurrence of the discontinuity, and hence offers an advantage of being able to minimize the image degradation due to errors.

A moving image decoding method according to the present invention sets, if decoding of coded data is completed without detecting any error in the coded data and if an occurrence of a discontinuity is detected between the coded data and the next coded data, a resynchronization point at an initial position of the next coded data estimated.

This makes it possible to set a suitable resynchronization point in response to the cause of the occurrence of the discontinuity, and hence offers an advantage of being able to minimize the image degradation due to errors.

A moving image decoding method according to the present invention performs, if an error is detected in data multiplexed after a unique word and if an occurrence of a discontinuity is detected between the coded data and the next coded data, a concealment processing of the data without using motion vectors obtained from the coded data, and performs, if an error is detected in the data multiplexed after the unique word and if the occurrence of the discontinuity is not detected between the coded data and the next coded data, a concealment processing of the data using the motion vectors obtained from the coded data.

This offers an advantage of being able to carry out suitable concealment of the macroblock data lost by errors.

The moving image decoding method according to the present invention can identify the occurrence of the discontinuity when a gap is present between the two adjacent coded data.

This offers an advantage of being able to detect the occurrence of the discontinuity easily.

The moving image decoding method according to the present invention can identify the occurrence of the discontinuity when an overlap is present between the two adjacent coded data.

This offers an advantage of being able to detect the occurrence of the discontinuity easily.

The moving image decoding method according to the present invention can contain motion vectors in the data multiplexed before the unique word.

This offers an advantage of being able to perform concealment processing using the motion vectors even if an error takes place in the data after the unique word.

DETAILED DESCRIPTION OF THE PREFERRED EMBODIMENTS

A best mode for carrying out the invention will now be described with reference to the accompanying drawings to explain the present invention in more detail.

Embodiment 1

The embodiment 1 will disclose a proper resynchronization technique that can carry out an accurate assessment of the condition when the discontinuity occurs between image data each constituting a resynchronization unit in a video decoder (moving image decoding apparatus) that performs syntax analysis and decoding by capturing a video bit stream coded by an MPEG-4 coding scheme.

It is assumed here that the video bit stream coded by the MPEG-4 coding scheme is coded using the data partitioning function ruled by MPEG-4.

First, each frame of moving image sequence (referred to as "video object plane: VOP" in MPEG-4) is divided into resynchronization units called "video packets".

Here, the video packet refers to a set of a plurality of macroblocks on an image space. In contrast, on a bit stream, it refers to a unit of coded data consisting of a plurality of macroblocks, beginning with a video packet header.

The data partitioning refers to a syntax structure in which important data among the macroblock data in a video packet is collectively multiplexed onto a bit stream before a predetermined unique word functioning as a delimiter, followed by multiplexing less important data. The data partitioning specified by the MPEG-4 standard refers to generating a bit stream in accordance with the foregoing syntax structure, and restoring the macroblock data by accurately analyzing the structure. A method of utilizing the data partitioning in case of error is not ruled by the standard, and the decoding result in case of error depends on decoder implementation.

The present embodiment 1 discloses measures against errors in a decoder utilizing the data partitioning structure. More specifically, it accurately decides a resynchronization point when discontinuity takes place between two spatially adjacent video packets, and carries out control such that the data is not discarded in waste.

Assume the following case. The video packet header includes absolute position information (macroblock_number) in the VOP initial macroblock in the video packet. Therefore, the position of the initial macroblock of the video packet can be determined by only referring to the macroblock_number.

Generally, any two adjacent video packets on an image must be continuous. However, such cases can occur that a gap takes place between the video packets because of an error, or that macroblocks of a video packet can be overwritten by the retreat of the initial macroblock of the next video packet. Such displacement of the video packet on the image will cause the macroblock data to be displayed in a position removed from its right position, thereby sharply degrading subjective image quality. Therefore it is very important to prevent such image degradation due to errors as much as possible.

Figure 1:
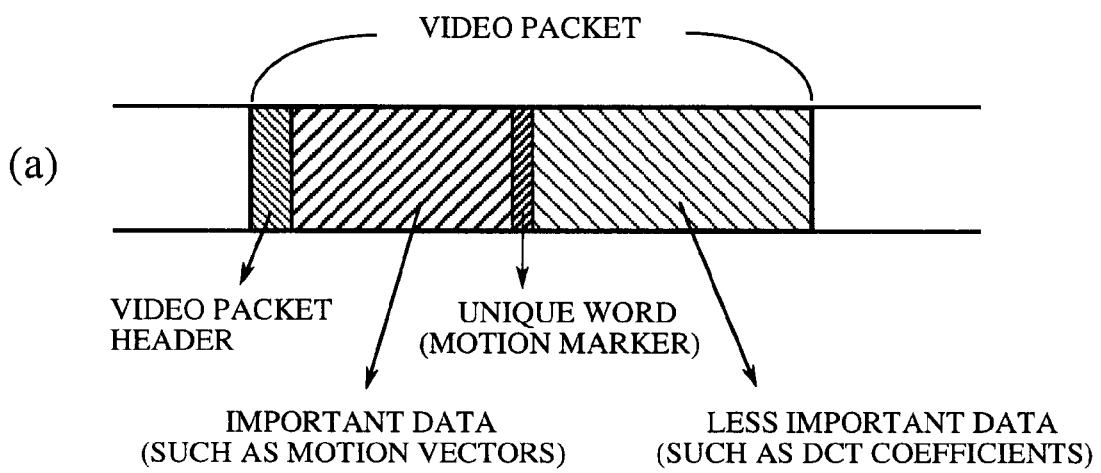
FIG. 1 is a diagram illustrating the partitioning syntax of MPEG-4 video data.
Figure 1:
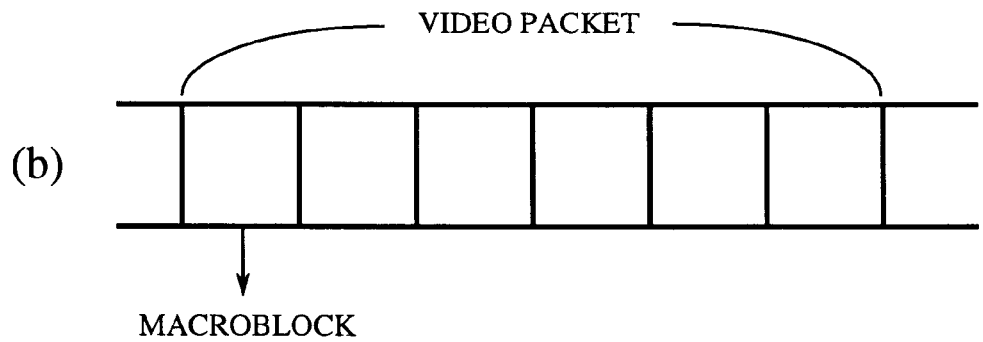
Figure 2:
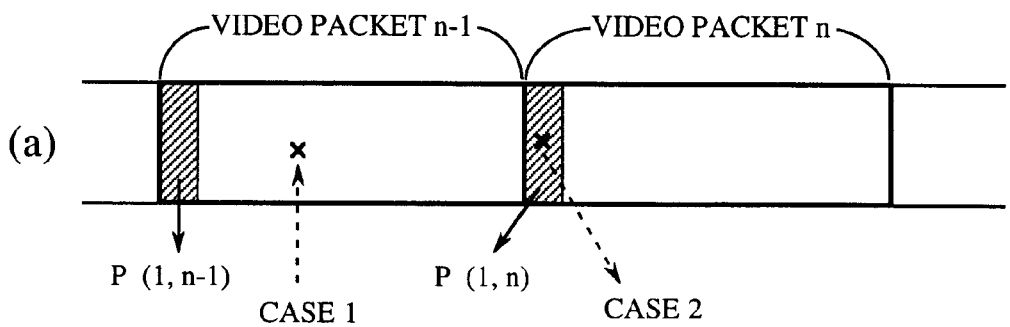
FIG. 2 is a diagram illustrating error conditions to be processed by a video decoder.
Figure 2:
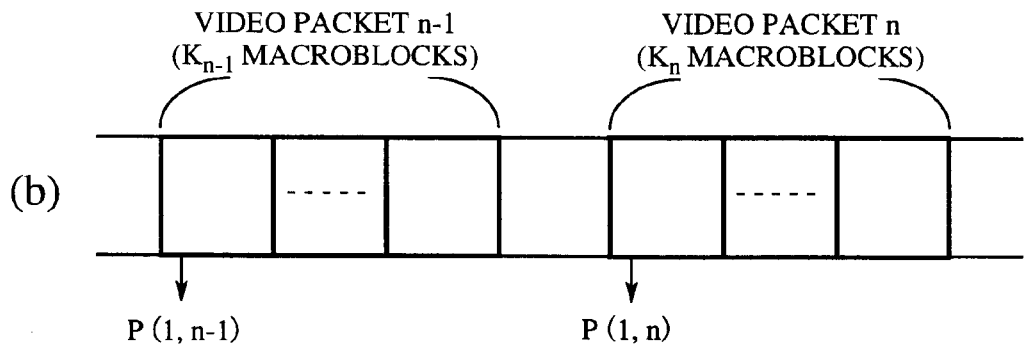

Such a condition can take place in cases as illustrated in FIG. 2 (in which a gap occurs). In case 1, although an error takes place in the previous video packet n−1, it is not detected as an error so that the decoding of variable length codes is continued in an out-of-synchronization state, reducing the number of the macroblocks in the video packet n−1 from the normal number of the macroblocks in the packet.

In this case, even if the absolute position information P(1,n) of the initial macroblock in the video packet n is decoded correctly, a gap takes place between the final macroblock of the video packet n−1 and the video packet n.

In case 2, the absolute position information P(1,n) of the initial macroblock of the video packet n suffers an error.

Generally, although either of the two cases will bring about a discontinuity between the video packets, it is difficult to identify its cause. Thus, if such a discontinuity takes place, one of the following two actions has been taken: continuing the decoding with verifying the latest information on the video packet n and continuing the decoding with accepting the discontinuity; or establishing the resynchronization with the next video packet n+1 for recovery.

The two actions, however, have the following problems.

The former can display the video packet n in a wrong position when the absolute position information P(1,n) includes an error because it continues decoding with accepting the discontinuity.

The latter can discard the correct video packet n in its entirety even when the P(1,n) is free from an error.

In the present embodiment 1, a method and apparatus will be described that can make suitable resynchronization decision by accurately locating the discontinuity error occurring in a video packet using the bit stream undergone the data partitioning.

(1) Detecting Scheme

In the data partitioning syntax, the macroblock data in each video packet is disposed before and after the unique word, and the number of the macroblocks in the video packet can be recognized before the unique word.

Assuming that the total number of macroblocks in the video packet n−1 reckoned before the unique word is $K_{n-1}$, a discontinuity takes place between the adjacent video packets if the following condition is satisfied.

$$P(1,n) \neq P(1,n-1) + K_{n-1} \quad (1)$$

In the case of the gap as illustrated in FIG. 2, the following expression holds, $$P(1,n) > P(1,n-1) + K_{n-1}$$

whereas when the video packet n−1 overlaps with the video packet n, the following expression holds although not illustrated in the drawings.

$$P(1,n) < P(1,n-1) + K_{n-1}$$

Although either of the two cases can be seen as a discontinuity, only the former case will be described because they can be handled in the same manner.

Assuming that the absolute position information P(1,n−1) is always detected correctly, the foregoing conditions hold only when an error occurs in the P(1,n), in $K_{n-1}$ or in both.

When the data partitioning is not used, the macroblock number $K_{n-1}$ is determined for the first time when the video packet n appears. Hence, it is impossible to make a decision as to whether the $K_{n-1}$ is correct or not.

In contrast with this, when the data partitioning is used, the macroblock number $K_{n-1}$ is determined in advance unless an error is detected before the unique word. This makes it possible to give the initial position of the video packet n, which can be used for deciding the resynchronization point.

Thus, unless an error is explicitly detected at the end of the video packet n−1, the value $K_{n-1}$ is considered as a correctly decoded value. Here, the term "an error detected at the end of the video packet n−1" refers to either a case in which the initial position of the video packet n is yet to be detected even after decoding the number of macroblocks corresponding to the $K_{n-1}$, or a case in which the initial position of the video packet n is detected before decoding the macroblocks corresponding to the macroblock number $K_{n-1}$.

In the event of the value $K_{n-1}$ being decoded incorrectly without explicitly detecting the error (it not impossible that decoding is continued without detecting the error even if the variable length code is brought out of synchronization), the data after the unique word can be decoded out-of-synchronization without detecting the error. However, it is a very unlikely error state that can occur at a very low probability.

If the $K_{n-1}$ is not decoded correctly, it is usually very likely that some error is detected in the data area after the unique word, or some incoherence takes place at the end of the video packet n−1. Therefore, when the initial position of the video packet n is detected without any error, the value $K_{n-1}$ can be considered to be highly reliable data. On the contrary, when an error is detected at the end of the video packet n−1, the reliability of the value $K_{n-1}$ is low. Thus, the following criterion of judgement can be provided.

"When a discontinuity takes place between the video packets n−1 and n in the case where no error is explicitly detected up to the end of the video packet n−1, the data in the P(1,n) is incorrect."

Although the criterion of judgement may seem to be obvious, it differs from the conventional technique in that it can almost always decide the cause of the discontinuity between the video packets when the prescribed conditions are satisfied.

(2) Implementation by Means of Apparatus

Figure 3:
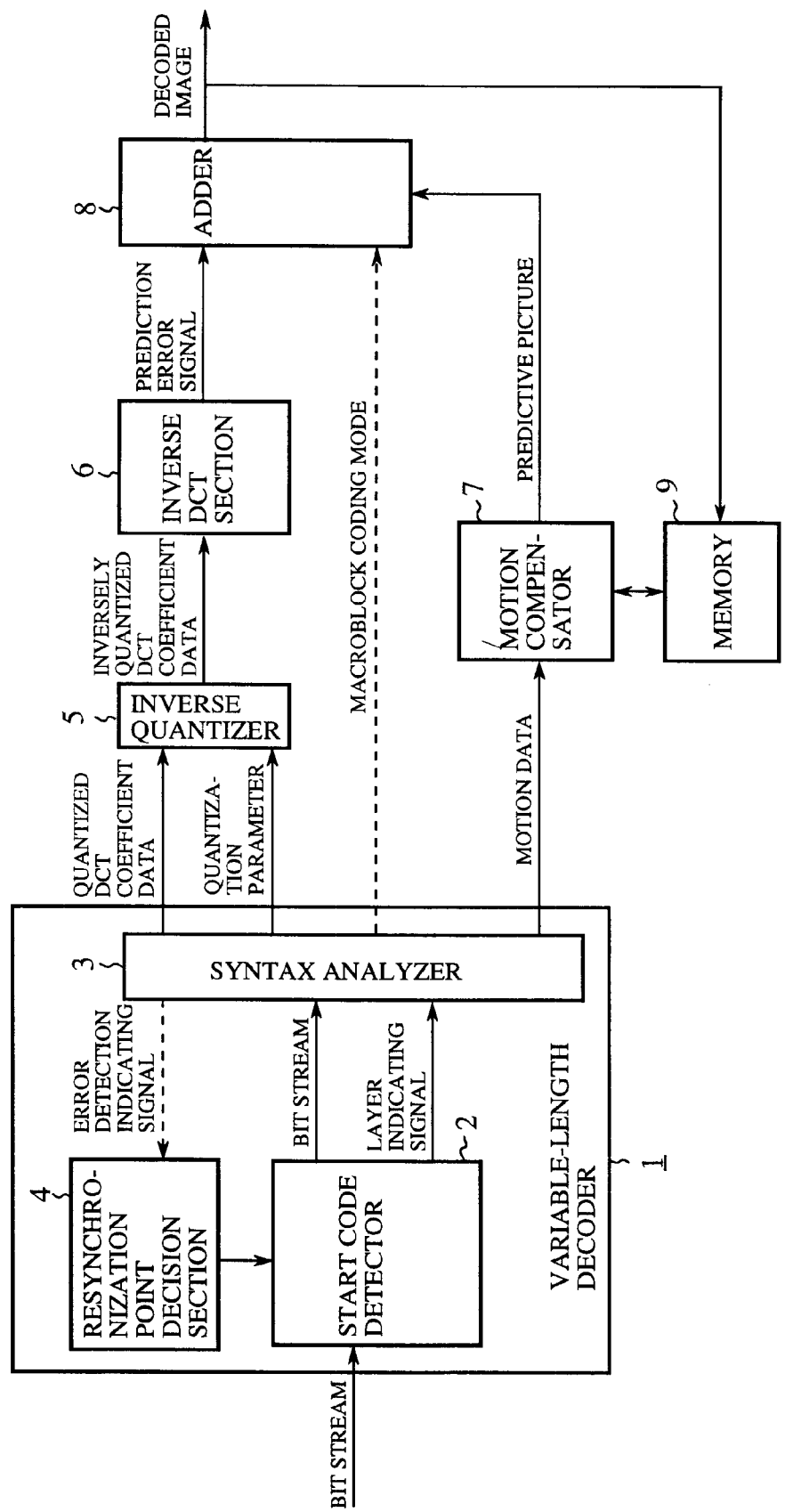
FIG. 3 is a block diagram showing a configuration of an embodiment 1 of a moving image decoding apparatus in accordance with the present invention.

FIG. 3 is a block diagram showing a configuration of the embodiment 1 of the moving image decoding apparatus in accordance with the present invention. In this figure, the reference numeral 1 designates a variable-length decoder for decoding an MPEG-4 video coded bit stream by analyzing it according to the bit stream syntax specified by the MPEG-4 standard to restore coded data; 2 designates a start code detector (detecting means) for detecting start points of the upper layers of the video data; 3 designates a syntax analyzer (decoding means, detecting means and reviewing means) for analyzing the layer data designated by layer indicating signals in order to decode the coded data and to detect a decoding error of the coded data; and 4 designates a resynchronization point decision section (resynchronization means) for setting a resynchronization point.

The reference numeral 5 designates an inverse quantizer for dequantizing quantized DCT coefficient data; 6 designates an inverse DCT section for performing inverse DCT of the DCT coefficient data to restore data on the image space from the data on the frequency domain; 7 designates a motion compensator for generating predictive pictures by referring to macroblock-based motion vectors; 8 designates an adder for adding the predictive pictures to a prediction error signal output from the inverse DCT section 6 to generate a macroblock-based decoded image; and 9 designates a memory for storing the decoded images.

Next, the operation of the present embodiment 1 will be described.

First, receiving the MPEG-4 video coded bit stream, the variable length decoder 1 analyzes the bit stream in accordance with the bit stream syntax specified by the MPEG-4 standard, and restores the coded data (the operation of the variable length decoder 1 will be described in more detail later).

The quantized DCT coefficient data and quantization parameters in the coded data are supplied to the inverse quantizer 5 that carries out the inverse quantization, and transfers the DCT coefficient data undergone the inverse quantization to the inverse DCT section 6.

The inverse DCT section 6 performs the inverse DCT of the DCT coefficient data, thereby restoring the image space data from the frequency domain data. The image space data is usually transferred to the adder 8 as the prediction error signal.

The processing from the inverse quantizer 5 to the inverse DCT section 6 is carried out on a block by block basis, each block consisting of eight pixels by eight lines obtained by further dividing the macroblock. Receiving the prediction error signal corresponding to 4 block luminance components and 2 block chrominance components (Cb and Cr) included in each macroblock, the adder 8 adds to the prediction error signal the predictive pictures supplied from the motion compensator 7 to generate a final decoded image on a macroblock by macroblock basis.

The motion compensator 7, referring to the data associated with motion such as motion vectors fed from the variable length decoder 1 on the macroblock basis, extracts from the memory 9 the image data corresponding to the motion (previously decoded image), and outputs the data as the predictive pictures.

The adder 8 switches its operation in response to the coding mode of the macroblock. When the macroblock is intra (intra-frame) coded, the prediction error signal is output as the decoded image without change.

On the other hand, when the macroblock is inter (inter-frame motion compensation prediction) coded, the image data obtained by adding the prediction error signal to the predictive pictures is output as the decoded image. The decoded image is written into the memory 9 to be used for the next frame decoding.

Figure 4:
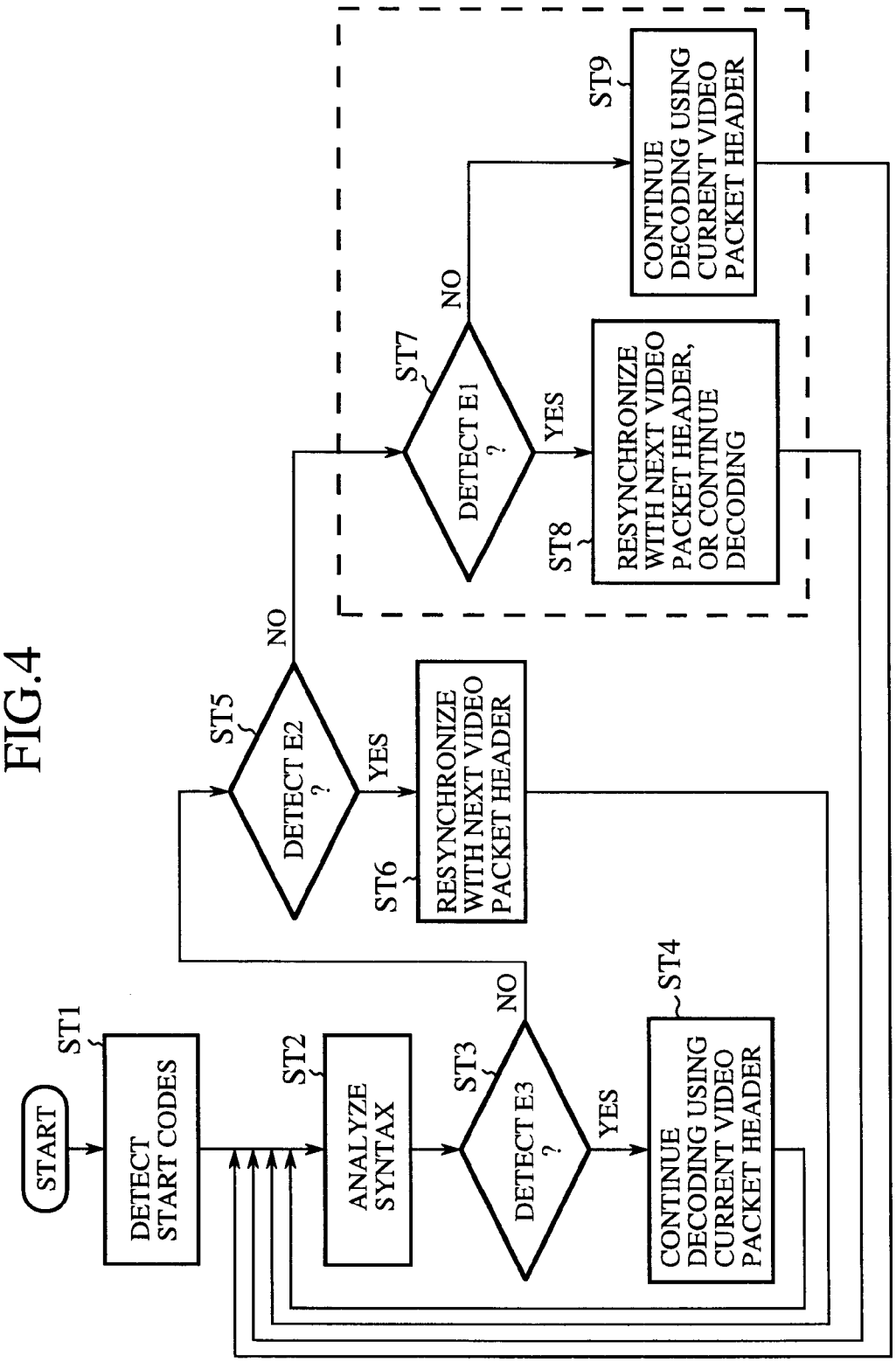
FIG. 4 is a flowchart illustrating a processing of a variable length decoder 1.

The variable length decoder 1 for implementing the detecting scheme mentioned in the foregoing (1) will now be described. FIG. 4 is a flowchart illustrating the processing of the variable length decoder 1.

In response to the bit stream the variable length decoder 1 receives, the start code detector 2 detects the start points of the upper layers of the video data (step ST1).

Figure 5:
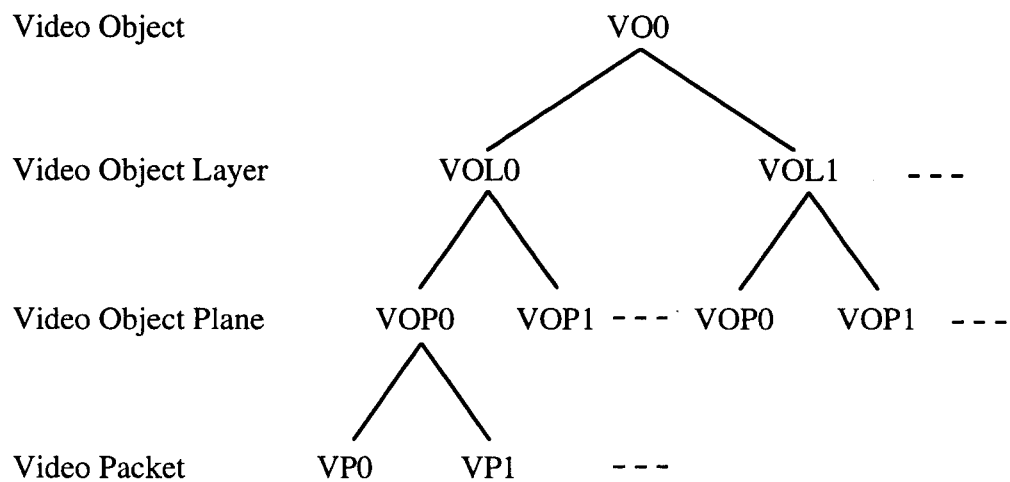
FIG. 5 is a structural diagram showing a layer structure of the MPEG-4 video data.

The layer structure of the MPEG-4 video data is shown in FIG. 5.

The start codes are unique words indicating the data start points of the respective layers from the VO (video object) layer to the VP (videopacket) layer of Fig. 5. The start code detector 2 detects the start codes sequentially in accordance with the layer structure of FIG. 5, and transfers the bit stream and the layer indicating signal to the syntax analyzer 3 every time it detects a start code. The syntax analyzer 3 analyzes the layer data indicated by the layer indicating signal to extract the coded data (step ST2).

The syntax analyzer 3 includes an error detecting mechanism for detecting decoding error. A typical error detection point takes place when the incorrect coded data detected brings the decoding out of synchronization, and hence disables the decoding. The syntax analyzer 3 of the present embodiment 1 can not only detect such a typical error point, but also include the error detecting mechanism as described in the foregoing (1) (see, E1–E3 below).

E1: A spatial discontinuity is present between the end of the video packet and the next video packet.
E2: The next video packet header cannot be detected correctly at the end of the video packet.
E3: The next video packet header is detected before the end of the video packet.

All the three above cover only the cases where no other errors are explicitly detected at any detecting points until the end of the video packet or the next video packet header is detected.

The decision of the resynchronization point for an error is made by the resynchronization point decision section 4 activated by an error detection indicating signal (that also indicates an error type) supplied from the syntax analyzer 3.

When the error E3 is detected (step ST3), the number of the macroblocks in the video packet is unreliable. Thus, a newly detected video packet (referred to as "current video packet" in FIG. 4) is assumed to be reliable, and the decoding is continued (step ST4). In this case, the resynchronization point decision section 4 carries out no processing.

When arriving at the end of the current video packet without detecting any E3 and not detecting the next video packet header correctly, that is, when detecting the error E2 (step ST5), the resynchronization point decision section 4 decides that the video packet header that appears next is a resynchronization point, and notifies the start code detector 2 of this using a resynchronization point indicating signal to have it search for the resynchronization point. Thus, the normal decoding is recovered from the first video packet header detected (step ST6)

The search for the video packet header corresponds to the detection of a resynchronization marker (that is, the start code associated with the video packet).

When detecting the next video packet header on the assumption that neither the error E2 or E3 is detected, the syntax analyzer 3 detects the presence and absence of an error E1 from the position information P(1,n−1) of the initial macroblock of the current video packet, from the macroblock number $K_{n-1}$ included in the video packet and from the absolute position information P(1,n) of the initial macroblock of the newly detected video packet (step ST7).

When detecting the error E1, the syntax analyzer 3 makes a decision that the P(1,n) is incorrect with a high probability, and continues the search for the next video packet. Alternatively, it continues decoding considering that the initial macroblock position obtained from the P(1,n−1) and $K_{n-1}$ (step ST8) is reliable.

In this case, the P(1,n) is considered to be incorrect with a substantially high probability. Therefore, a better result will be obtained by continuing decoding with only correcting the position relying on the video packet rather than by searching for a new video packet.

When the E1 is not detected, the decoding is continued using the next video packet header (step ST9).

As described above, the present embodiment 1 is configured such that if an inter-coded data discontinuity is detected without detecting any error of the coded data, the initial position or the like of the subsequent coded data is set as the resynchronization point. This makes it possible to establish a suitable resynchronization point depending on the cause of the discontinuity, offering an advantage of being able to minimize the image degradation due to errors.

In other words, the present embodiment 1 can identify the cause of errors at high reliability in contrast to the conventional technique that cannot easily identify the cause of discontinuity errors between the video packets uniquely.

Embodiment 2

In the present embodiment 2, an MPEG-4 video decoder will be described which can carry out proper error concealment by utilizing the fact that the macroblock number in the video packet is determined in advance using the data partitioning syntax as in the foregoing embodiment 1.

(1) Adaptive Decision Method

Figure 6:
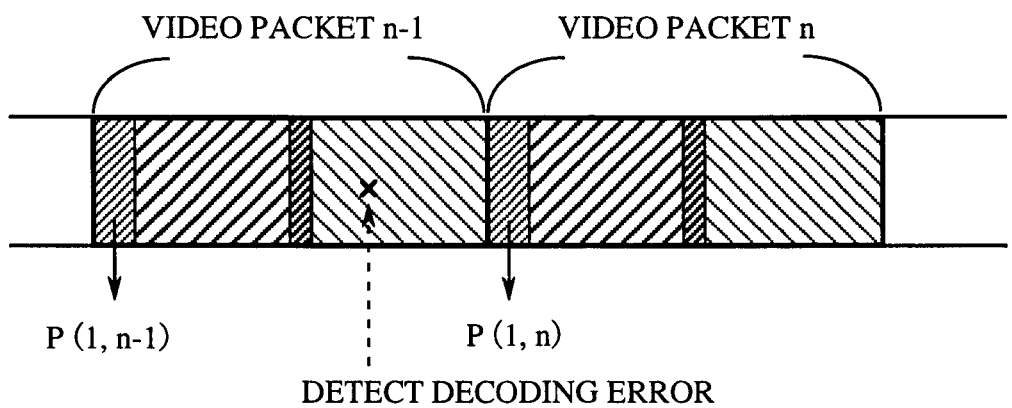
FIG. 6 is a diagram illustrating an error condition to be handled by the video decoder.

Referring to FIG. 6, the idea of the present embodiment 2 will be described.

As described in the foregoing embodiment 1, in the data partitioning syntax, the macroblock number $K_{n-1}$ included in the video packet n−1 is determined before detecting the unique word in the video packet n−1. Furthermore, the discontinuity between the video packets can be recognized by expression (1) described in the foregoing embodiment 1 using the initial macroblock positions P(1,n−1) and P(1,n) of the video packets n−1 and n.

Here, the term "discontinuity" covers the cases as described in the foregoing embodiment 1, in which a spatial gap takes place between the video packets n−1 and n, and a spatial overlap takes place between the video packets n−1 and n.

The video decoder of the present embodiment 2 comprises a switching means for adaptively switching concealment processing of an error detected in the decoding process of the video packet n−1 in response to the presence or absence of the discontinuity between the video packets.

Here, the error (designated by X) detected in the course of decoding the video packet n−1 is assumed to be detected after the unique word (because the macroblock number $K_{n-1}$ cannot be decided when the error is detected before the unique word), and the video packet n is assumed to be obtained as a result of establishing the resynchronization against the error.

Let us consider the following two cases. [Case 1] The discontinuity is present between the video packets n−1 and n.

In this case, since the relationship between the $K_{n-1}$ and P(1,n−1) and P(1,n) becomes as expression (1), the validity of the macroblock number $K_{n-1}$ is not ensured, which means that an error can take place in a highly important data area such as motion vectors. Thus, all the macroblocks contained in the video packet n−1 are subjected to the concealment processing without using the highly important data. [Case 2] The discontinuity is not present between the video packets n−1 and n.

In this case, the validity of the macroblock number $K_{n-1}$ is almost certain, which means that no error is present in the highly important data area such as the motion vectors. Therefore, all the macroblocks contained in the video packet n−1 are subjected to the concealment processing utilizing the highly important data.

(2) Implementation by Means of an Apparatus

Since the present embodiment 2 of the video decoder (moving image decoding apparatus) differs only in the syntax analyzer 3 and resynchronization point decision section 4 of the variable length decoder 1 as shown in FIG. 3, only the different portions will be described here.

Figure 7:
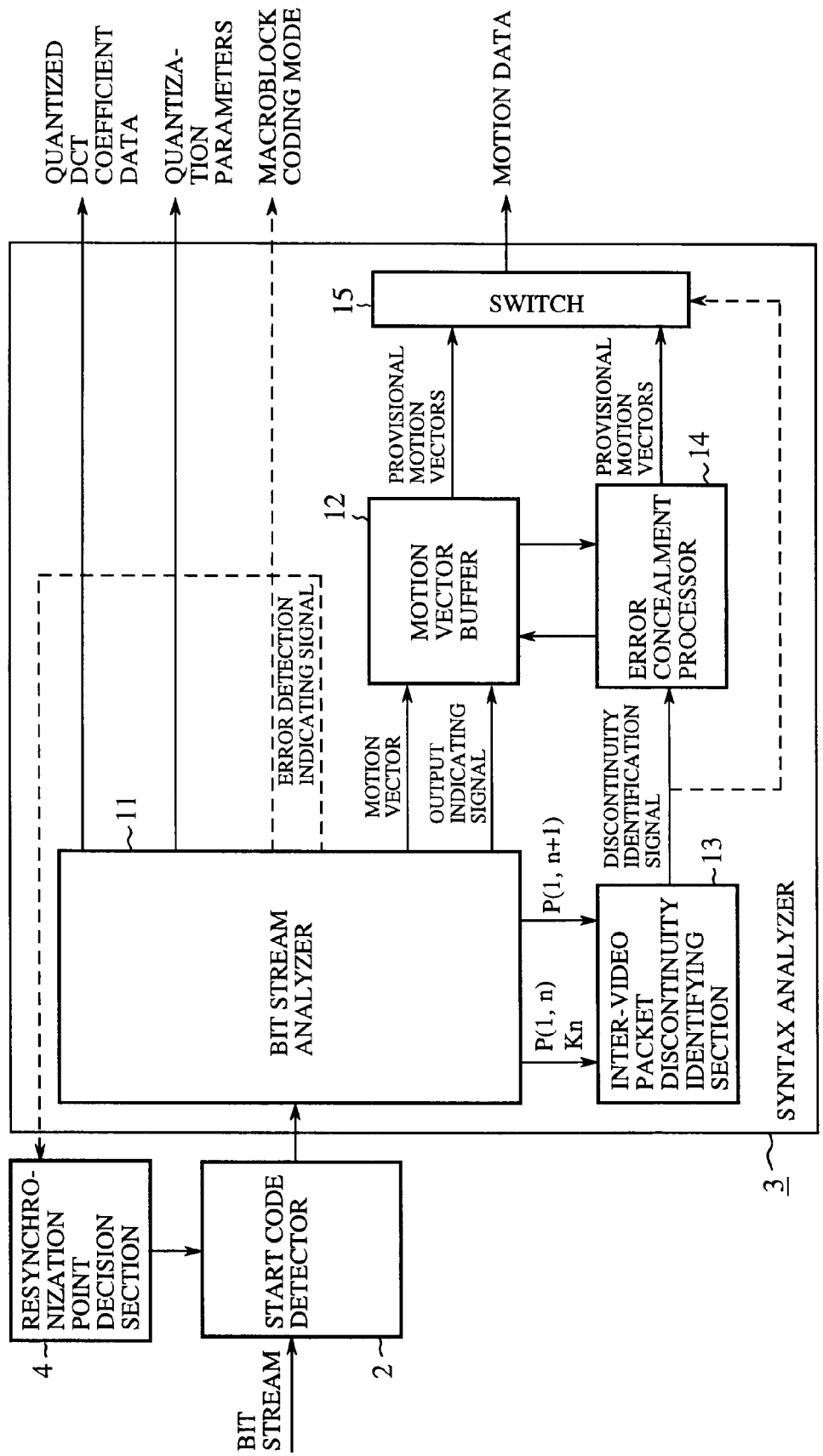
FIG. 7 is a block diagram showing an internal configuration of a syntax analyzer 3.

FIG. 7 is a block diagram showing an internal configuration of syntax analyzer 3 in detail. In this figure, the reference numeral 11 designates a bit stream analyzer for extracting coded data from the bit stream in the normal decoding mode, and for detecting a decoding error to control peripherals in response to the error; 12 designates a motion vector buffer for storing motion vectors (provisional motion vectors) by an amount of one video packet for the data partitioning syntax structure; 13 designates an inter-video packet discontinuity identifying section for decoding the initial macroblock position information P(1,n+1) in the header, and for checking the discontinuity between the video packets n and n+1 using the P(1,n) and $K_n$; 14 designates an error concealment processor (concealment means) for producing provisional motion vectors in response to the detection of the discontinuity; and 15 designates a switch for outputting as motion data one of the provisional motion vectors supplied from the motion vector buffer 12 and the provisional motion vectors supplied from the error concealment processor 14.

Figure 8:
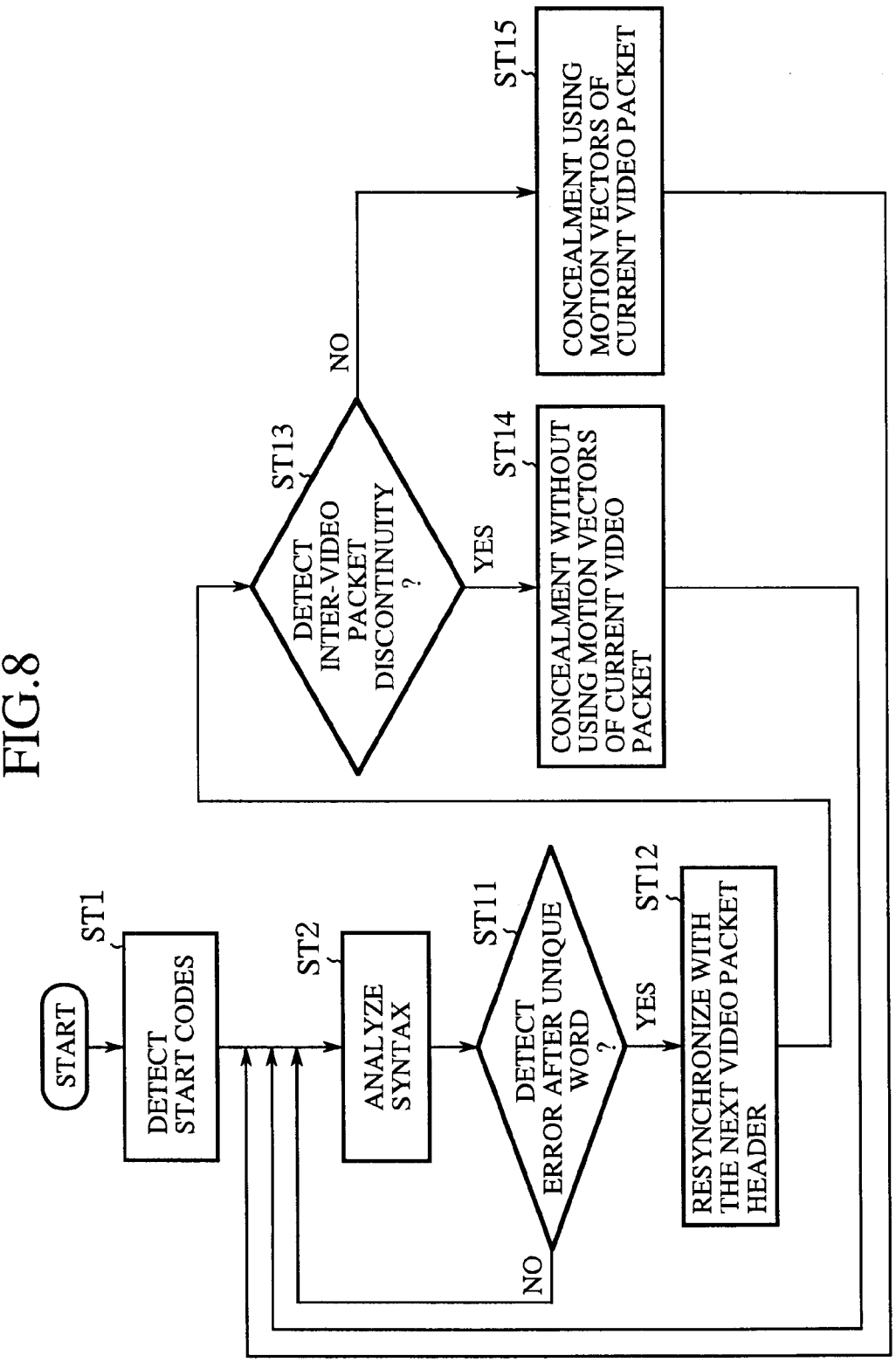
FIG. 8 is a flowchart illustrating a processing of the syntax analyzer 3.

Next, the operation of the present embodiment 2 will be described with reference to FIG. 8, the flowchart illustrating the processing of the syntax analyzer 3.

The bit stream analyzer 11 has functions to extract the coded data from the bit stream in the normal decoding mode and to detect the decoding error for controlling the peripherals in response to the error. While continuing the decoding in the normal decoding mode, the bit stream analyzer 11 extracts the header data of the upper layers (a greater part of the header data is utilized within the bit stream analyzer 11 to extract the macroblock-based coded data), macroblock-based quantized DCT coefficient data, quantization parameters and motion data, and outputs the data it extracts (step ST2).

Incidentally, since the output procedure of the motion data is rather special, it will be described here. The output of the motion data is made by the motion vector buffer 12. The motion vector buffer 12 is for storing the motion vectors corresponding to one video packet for the data partitioning syntax structure. By analyzing the data before the unique word of the video packet, the motion vectors corresponding to all the macroblocks contained in the video packet (assuming that all the macroblocks are coded by motion compensation prediction) are stored in the motion vector buffer 12.

Each of the motion vectors is transferred by an output indicating signal to the motion compensator 7 as the motion data every time the bit stream analyzer 11 decodes one macroblock from the data after the unique word.

Let us consider a case in which an error is detected in the video packet n after the unique word (step ST11). In this case, the macroblock number $K_n$, contained in the video packet n has already been decided.

First, the header of the video packet n+1 is searched for to establish the resynchronization (step ST12). The resynchronization mechanism is carried out in the following procedure: the bit stream analyzer 11 outputs the error detection indicating signal; the resynchronization point decision section 4 sets, in response to the error detection indicating signal, the header of the video packet n+1 as the resynchronization point; and the start code detector 2 detects the resynchronization marker.

Subsequently, the bit stream analyzer 11 decodes the initial macroblock position information P (1, n+1) in the header, and the inter-video packet discontinuity identifying section 13 in FIG. 7, receiving the P(1,n+1), P(1,n) and $K_n$, checks the discontinuity between the video packets n and n+1 using the P(1,n) and $K_n$, (step ST13).

When a decision is made that the discontinuity is present, the value $K_n$, is considered unreliable. Therefore, all the macroblock areas in the video packet n undergo the error concealment processing without using the motion vectors (step ST14). The concealment processing is carried out by the error concealment processor 14 activated by a discontinuity identification signal output from the inter-video packet discontinuity identifying section 13.

The error concealment processor 14, in response to the discontinuity detected by the inter-video packet discontinuity identifying section 13, sets the provisional motion vectors to zero, and transfers them to the switch 15.

The switch 15 outputs, when the discontinuity identification signal indicates "discontinuity", the provisional motion vectors supplied from the inter-video packet discontinuity identifying section 13, as the motion data.

In contrast, when no discontinuity is recognized, the value $K_n$ is considered reliable. Accordingly, all the macroblock areas in the video packet n are subjected to the error concealment processing using the motion vectors stored in the motion vector buffer 12 (step ST15). In this case, the error concealment processor 14 has the motion vector buffer 12 sequentially output the motion vectors to be supplied to the switch 15 as the provisional motion vectors.

The switch 15 outputs, when the discontinuity identification signal indicates "no discontinuity", the provisional motion vectors supplied from the motion vector buffer 12, as the motion data.

In case of identifying a discontinuity, the bit stream analyzer 11 places all the quantized DCT coefficient data in the video packet n at zero and transfers the data, whereas in the case of not identifying any discontinuity, it places only the quantized DCT coefficient data associated with the macroblocks in the video packet n after the error at zero and transfers the data.

In response to the foregoing operation, the video decoder blocks after the variable length decoder 1 continue the same processing as the normal decoding processing, thereby carrying out appropriate error concealment.

Although the data partitioning syntax structure according to the MPEG-4 standard recommends to process errors taking place in the video packet n−1 after the unique word by means of the concealment utilizing the motion vectors on the assumption that the macroblock number $K_{n-1}$ is always reliable, such error concealment can sometimes bring about sharp image degradation when the $K_{n-1}$ is unreliable. In contrast with this, the present embodiment 2, which also utilizes the inter-video packet discontinuity to check the reliability of the $K_{n-1}$ before carrying out the error concealment, can implement more proper concealment.

INDUSTRIAL APPLICABILITY

As described above, the moving image decoding apparatus and a moving image decoding method according to the present invention, which are based on the moving image compression and decompression schemes of various international standards, set a suitable resynchronization point in response to a cause of a discontinuity detected in coded data, in the implementation technique of the video decoder that sets a new resynchronization point. Thus, they are applicable to a system to minimize the image degradation due to the discontinuity of the coded data.

What is claimed is:

1. A moving image decoding apparatus comprising:
   decoding means for decoding coded data consisting of a plurality of data contained in a plurality of macroblocks and multiplexed before and after a unique word;
   detecting means for detecting position information indicating an initial position of the coded data said decoding means decodes, and for detecting a number of the macroblocks constituting the coded data;
   reviewing means for estimating an initial position of next coded data from the position information and the number of the macroblocks detected by said detecting means, and for checking an occurrence of a discontinuity between the coded data and the next coded data on an image space; and
   resynchronization means for setting, if said decoding means completes decoding of the coded data without detecting any error in the coded data and if said reviewing means detects the occurrence of the discontinuity, a resynchronization point at an initial position of coded data subsequent to the next coded data.

2. A moving image decoding apparatus comprising:
   decoding means for decoding coded data consisting of a plurality of data contained in a plurality of macroblocks and multiplexed before and after a unique word;
   detecting means for detecting position information indicating an initial position of the coded data said decoding means decodes, and for detecting a number of the macroblocks constituting the coded data;
   reviewing means for estimating an initial position of next coded data from the position information and the number of the macroblocks detected by said detecting means, and for checking an occurrence of a discontinuity between the coded data and the next coded data on an image space; and
   resynchronization means for setting, if said decoding means completes decoding of the coded data without detecting any error in the coded data and if said reviewing means detects the occurrence of the discontinuity, a resynchronization point at an initial position of the next coded data estimated by said reviewing means.

3. A moving image decoding apparatus comprising:
   decoding means for decoding coded data consisting of a plurality of data contained in a plurality of macroblocks and multiplexed before and after a unique word;
   detecting means for detecting position information indicating an initial position of the coded data said decoding means decodes, and for detecting a number of the macroblocks constituting the coded data;
   reviewing means for estimating an initial position of next coded data from the position information and the number of the macroblocks detected by said detecting means, and for checking an occurrence of a discontinuity between the coded data and the next coded data on an image space; and
   concealment means for performing, if said decoding means detects an error in the data multiplexed after the unique word and if said reviewing means detects the occurrence of the discontinuity, a concealment processing of the data without using motion vectors obtained from the coded data, and for performing, if said decoding means detects an error in the data multiplexed after the unique word and if said reviewing means does not detect any occurrence of a discontinuity, a concealment processing of the data using the motion vectors obtained from the coded data.

4. The moving image decoding apparatus according to claim 1, wherein said reviewing means identifies the occurrence of the discontinuity if a gap is present between the two adjacent coded data.

5. The moving image decoding apparatus according to claim 2, wherein said reviewing means identifies the occurrence of the discontinuity if a gap is present between the two adjacent coded data.

6. The moving image decoding apparatus according to claim 3, wherein said reviewing means identifies the occurrence of the discontinuity if a gap is present between the two adjacent coded data.

7. The moving image decoding apparatus according to claim 1, wherein said reviewing means identifies the occurrence of the discontinuity if an overlap is present between the two adjacent coded data.

8. The moving image decoding apparatus according to claim 2, wherein said reviewing means identifies the occurrence of the discontinuity if an overlap is present between the two adjacent coded data.

9. The moving image decoding apparatus according to claim 3, wherein said reviewing means identifies the occurrence of the discontinuity if an overlap is present between the two adjacent coded data.

10. The moving image decoding apparatus according to claim 3, wherein the data multiplexed before the unique word includes the motion vectors.

11. A moving image decoding method comprising the steps of:
   decoding coded data consisting of a plurality of data contained in a plurality of macroblocks and multiplexed before and after a unique word;
   detecting position information indicating an initial position of the coded data, and detecting a number of the macroblocks constituting the coded data;
   estimating an initial position of next coded data from the position information and the number of the macroblocks;
   checking an occurrence of a discontinuity between the coded data and the next coded data on an image space; and
   setting, if decoding of the coded data is completed without detecting any error in the coded data and if the occurrence of the discontinuity is detected, a resynchronization point at an initial position of coded data subsequent to the next coded data.

12. A moving image decoding method comprising the steps of:
   decoding coded data consisting of a plurality of data contained in a plurality of macroblocks and multiplexed before and after a unique word;
   detecting position information indicating an initial position of the coded data, and detecting a number of the macroblocks constituting the coded data;
   estimating an initial position of next coded data from the position information and the number of the macroblocks;
   checking an occurrence of a discontinuity between the coded data and the next coded data on an image space; and
   setting, if decoding of the coded data is completed without detecting any error in the coded data and if the occurrence of the discontinuity is detected, a resynchronization point at an initial position of the next coded data estimated.

13. A moving image decoding method comprising the steps of:
   decoding coded data consisting of a plurality of data contained in a plurality of macroblocks and multiplexed before and after a unique word;
   detecting position information indicating an initial position of the coded data, and detecting a number of the macroblocks constituting the coded data;
   estimating an initial position of next coded data from the position information and the number of the macroblocks;
   checking an occurrence of a discontinuity between the coded data and the next coded data on an image space; and
   performing, if an error is detected in the data multiplexed after the unique word and if the occurrence of the discontinuity is detected between the coded data and the next coded data, a concealment processing of the data without using motion vectors obtained from the coded data, and performing, if an error is detected in the data multiplexed after the unique word and if the occurrence of the discontinuity is not detected between the coded data and the next coded data, a concealment processing of the data using the motion vectors obtained from the coded data.

14. The moving image decoding method according to claim 11, wherein the occurrence of the discontinuity is identified if a gap is present between the two adjacent coded data.

15. The moving image decoding method according to claim 12, wherein the occurrence of the discontinuity is identified if a gap is present between the two adjacent coded data.

16. The moving image decoding method according to claim 13, wherein the occurrence of the discontinuity is identified if a gap is present between the two adjacent coded data.

17. The moving image decoding method according to claim 11, wherein the occurrence of the discontinuity is identified if an overlap is present between the two adjacent coded data.

18. The moving image decoding method according to claim 12, wherein the occurrence of the discontinuity is identified if an overlap is present between the two adjacent coded data.

19. The moving image decoding method according to claim 13, wherein the occurrence of the discontinuity is identified if an overlap is present between the two adjacent coded data.

20. The moving image decoding method according to claim 13, wherein the data multiplexed before the unique word includes the motion vectors.

* * * * *

UNITED STATES PATENT AND TRADEMARK OFFICE
CERTIFICATE OF CORRECTION

PATENT NO. : 6,665,345 B1
DATED : December 16, 2003
INVENTOR(S) : Shunichi Sekiguchi et al.

It is certified that error appears in the above-identified patent and that said Letters Patent is hereby corrected as shown below:

<u>Title page,</u>
Item [86], should read as follows:

-- [86] PCT NO.:     PCT/JP00/00839

§371(c)(1),
(2), (4) Date:     May 9, 2000

Signed and Sealed this

Twenty-sixth Day of October, 2004

JON W. DUDAS
*Director of the United States Patent and Trademark Office*